United States Patent
Maioli et al.

(10) Patent No.: US 9,871,357 B2
(45) Date of Patent: Jan. 16, 2018

(54) SYSTEMS AND METHODS FOR COOLING POWER TRANSMISSION SYSTEMS

(75) Inventors: Paolo Maioli, Milan (IT); Ernesto Zaccone, Milan (IT)

(73) Assignee: PRYSMIAN S.p.A., Milan (IT)

( * ) Notice: Subject to any disclaimer, the term of this patent is extended or adjusted under 35 U.S.C. 154(b) by 883 days.

(21) Appl. No.: 14/351,312

(22) PCT Filed: Oct. 27, 2011

(86) PCT No.: PCT/EP2011/068872
§ 371 (c)(1),
(2), (4) Date: Jun. 2, 2014

(87) PCT Pub. No.: WO2013/060374
PCT Pub. Date: May 2, 2013

(65) Prior Publication Data
US 2015/0207303 A1    Jul. 23, 2015

(51) Int. Cl.
*H02B 1/56* (2006.01)
*H02G 5/06* (2006.01)
(Continued)

(52) U.S. Cl.
CPC ............. *H02B 1/56* (2013.01); *H02G 5/063* (2013.01); *H02G 5/10* (2013.01); *H01B 7/421* (2013.01)

(58) Field of Classification Search
CPC .......... H02B 1/56; H02B 1/565; H01B 7/421; H01B 7/423; H01B 7/426
(Continued)

(56) References Cited

U.S. PATENT DOCUMENTS 3,739,596 A * 6/1973 Ballard ................ F25B 49/027
                                                                 62/158
6,740,994 B2 * 5/2004 Lee .......................... H02G 5/10
                                                                 310/166
(Continued)

FOREIGN PATENT DOCUMENTS

DE    2943073 A1 *  5/1981   .......... F24C 15/2021
DE    102008049566 A1   4/2010
(Continued)

OTHER PUBLICATIONS

Ramon Granadino et al., Undergrounding the First 400 KV Transmission Line in Spain Using 2500 MM2 XLPE Cables in a Ventilated Tunnel: The Madrid Barajas Airport Project, May 2003, p. 1, retrieved from the internet: http://www.jicable.org/2003/pdf/A12.pdf.
(Continued)

*Primary Examiner* — Fritz M Fleming
(74) *Attorney, Agent, or Firm* — MH2 Technology Law Group LLP

(57) ABSTRACT

A cooling system for cooling a power transmission system that includes a cable configured to carry a current corresponding to a transported electric power may include: a cooling device configured to remove heat from the power transmission system; a power supply system configured to extract a power fraction from the cable and configured to supply the cooling device with the power fraction; and a control unit configured to control an amount of the extracted power fraction in response to a parameter of the electric power. When the parameter is higher than a threshold, the extracted power fraction is equal to a first value that depends on the electric power carried in the cable through a first function. When the parameter is lower than the threshold, the extracted power fraction is equal to a second value that depends on the electric power carried in the cable through a second function.

20 Claims, 6 Drawing Sheets

(51) Int. Cl.
*H02G 5/10* (2006.01)
*H01B 7/42* (2006.01)

(58) Field of Classification Search
USPC .......................... 174/252; 361/676, 677, 678
See application file for complete search history.

(56) References Cited

U.S. PATENT DOCUMENTS

2002/0171986 A1    11/2002  Figueroa et al.
2003/0137267 A1*    7/2003  Blake .................... F04D 27/004
                                                          318/471

FOREIGN PATENT DOCUMENTS

GB          1193126 A          5/1970
JP          50077780            7/1975
JP          06162827 A    *   6/1994

OTHER PUBLICATIONS

Calcul De La Temperature Des Cables Dans Les Tunnel Ventiles, Electra No. 143-144, Aug. 1992.
International Search Report PCT/ISA/210 for International Application No. PCT/EP2011/068872 dated Jul. 10, 2012.

* cited by examiner

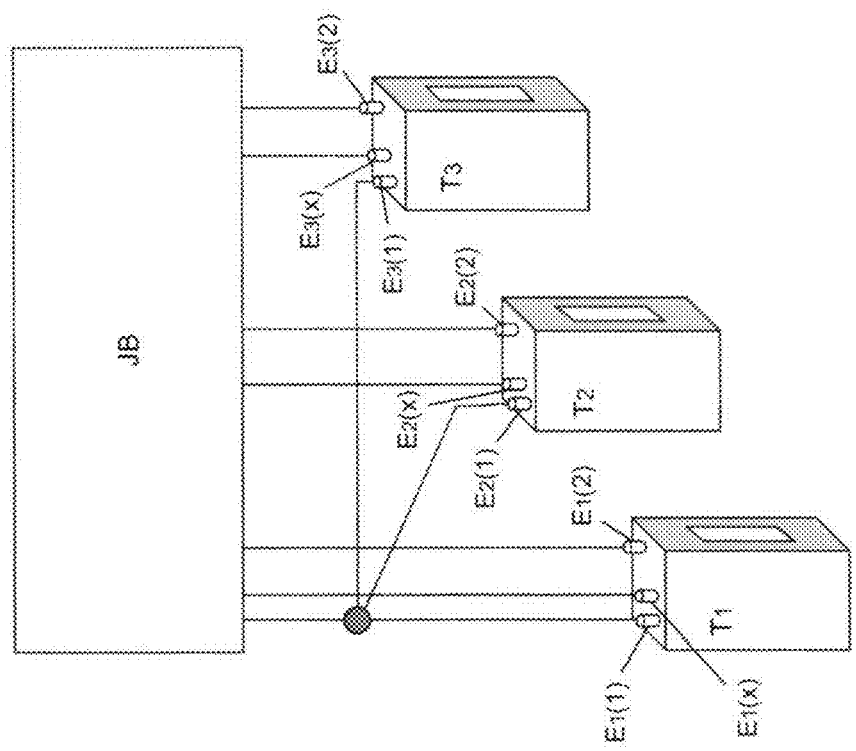

SYSTEMS AND METHODS FOR COOLING POWER TRANSMISSION SYSTEMS

CROSS-REFERENCE TO RELATED APPLICATION(S)

This application is a national stage entry from International Application No. PCT/EP2011/068872, filed on Oct. 27, 2011, in the Receiving Office of the European Patent Office, the entire contents of which are incorporated herein by reference, and claims the associated benefit under 35 U.S.C. §§120, 121, 363, and/or 365.

TECHNICAL FIELD

The present invention relates to the field of power transmission systems. In particular, the present invention relates to a cooling system and a method for cooling a power transmission system. The power transmission system may be a high voltage power transmission system at least partially laid down in a tunnel or a manhole.

BACKGROUND ART

As "power transmission system" it is meant a system configured to deliver electricity to end users. To this purpose, a power transmission system may comprise electrical cables and joints and electrical apparatuses such as substations, transformers, disconnectors, switches, etc. The power transmission system may be either three-phase or single-phase and can carry power in the form of both direct current (DC) and alternating current (AC).

During operation, a power transmission system is typically subject to heating. Such heating is mostly due to the so-called Joule effect, according to which a current passing through a conductor having a certain resistance produces heat. The produced heat is proportional to the square of the current multiplied by the conductor resistance.

In order to prevent an undesired overheating of a power transmission system, its temperature should be kept under control by removing at least part of the heat produced by the passage of the current.

In particular, it is important to maintain the cable temperature below its top operating temperature. Over said limit, the cable performance is impaired due to resistive losses and the overall cable structure can be damaged by excessive heat.

The operation of removing heat is of particular importance when the power transmission system is at least partially laid down in a closed or partially closed environment, where air circulation is difficult or substantially absent. This is the case when the power transmission system is at least partially installed underground, for instance in a tunnel or in a manhole.

The temperature control of a power transmission system is typically performed by a cooling system comprising cooling devices (for instance, fans) placed at predetermined positions of the power transmission system. In particular, the cooling devices are typically placed in the vicinity of components of the power transmission system that are particularly prone to heating (e.g. due to a particularly high resistance), such as joints between electrical cables.

Granadino et al., Jicable '03, A.1.2, Jun. 22-26, 2003 describe a project for undergrounding a 400 kV power transmission line in a ventilated tunnel equipped with a forced cooling system. The forced cooling system comprises fan stations injecting fresh air inside the tunnel. The tunnel temperature is measured continuously by a Distributed Temperature Sensing (DTS) system and operation of the fans (with inverters to regulate the fan speed) is controlled by an automatic Real Time Thermal Rating (RTTR) system. This ensures that the boundary conditions on tunnel and cable temperatures are not exceeded.

GB 1,193,126 discloses an electric cable or bus-bar installation for transmitting electric power, of the kind in which heat generated in a load carrying conductor or conductors is dissipated by the circulation of a cooling fluid. The installation incorporates means for circulating or assisting the circulation of the cooling fluid, driven by an electric motor deriving all or part of its power supply from the secondary winding of at least one current transformer, the primary winding of which is a load carrying conductor forming part of the installation. The rate of circulation of the cooling fluid hence automatically varies in proportion to the load carried by the installation and may be caused to cease altogether when, owing to a reduction or cessation of the load, no artificial cooling is required.

The Applicant observes that the known cooling systems exhibit some drawbacks.

A cooling system like that described by Granadino et al. requires a complex installation, because dedicated circuits (namely, low voltage lines and inverters) are to be laid down in the tunnel for powering the fans stations. This also results in an increased cost of the system. Furthermore, such cooling system is not safe. Indeed, in case of a failure affecting the low voltage circuit supplying the fan stations and not the power transmission line, the cooling system stops operating, while the power transmission line is still operating and hence is still producing heat. In such situation, the temperature of the power transmission line cannot be controlled. The power transmission line may then overheat, which causes wear of the power transmission line and may even lead to hazardous events such as fires.

A cooling system like that disclosed by GB 1,193,126 is not economically efficient when the electric cable is carrying a reduced load. Although cooling a cable in general leads to a decrease of its resistance, and accordingly to a decrease of the power loss of the cable (which in turn results in a decrease of the cost for transporting power through the cable), in case of very reduced loads the cost decrease associated to the cable resistance reduction may be lower than the cost associated to the operation of the cooling system. As a consequence, circulating a cooling fluid in a rate proportional to the load carried by the installation results in an increase of the overall operational cost of the installation when the cable is carrying a reduced load.

On the other side, the Applicant observed that also ceasing the circulation of the cooling fluid owing to a reduction of the cable load surprisingly brings to an increase of the overall operational cost of the installation.

In view of the above, the Applicant has tackled the problem of providing a cooling system and a method for cooling a power transmission system (in particular, but not exclusively, a high voltage power transmission system), which overcomes the aforesaid drawbacks.

SUMMARY

In the present description and in the claims, the expression "high voltage power transmission system" will designate a power transmission system suitable for transmitting power at a voltage higher than 35 kV.

In particular, the Applicant has tackled the problem of providing a cooling system and a method for cooling a power transmission system (in particular, but not exclusively, a high voltage power transmission system) which is safe and which has a very reduced operational cost even in case of reduced loads.

The Applicant found that a cooling system fed by the current carried by the power transmission system to be cooled can have a more efficient performance with reduced cost if the current transferred to the cooling system is regulated according to a first or to a second function selected in view of the value of an operation parameter of the transmission system.

According to a first aspect, the present disclosure relates to a cooling system for cooling a power transmission system comprising a cable carrying a current corresponding to a transported electric power, the cooling system comprising:
- a cooling device arranged to remove heat from the power transmission system;
- a power supply system arranged to extract a power fraction from the cable and to supply the cooling device with said power fraction;
- a control unit configured to control the amount of the extracted power fraction responsive to a parameter of the power transported in the cable, so that
  - when the parameter is higher than a threshold, the extracted power fraction is equal to a first value depending on the power carried in the cable through a first function; and
  - when the parameter is lower than the threshold, the extracted power fraction is equal to a second value depending on the power carried in the cable through a second function, the second function corresponding to the first function multiplied by a factor k, k being higher than 0 and lower than 1.

Preferably, the factor k is a constant value for a given system.

According to a second aspect, the present disclosure relates to a method for cooling a power transmission system, said power transmission system comprising a cable carrying a current corresponding to a transported electric power, said method comprising:
- extracting a power fraction from said cable; and
- supplying said cooling device, which is arranged to remove heat from said power transmission system, with the power fraction,
- wherein the power fraction is extracted so that:
- when a parameter of said power transported in the cable is higher than a threshold, said extracted power fraction is equal to a first value depending on the power carried in the cable through a first function; and
- when said parameter is lower than said threshold, said extracted power fraction is equal to a second value depending on the power carried in the cable through a second function, said second function corresponding to said first function multiplied by a factor k, k being higher than 0 and being lower than 1.

Preferably, the power supply system comprises at least one transformer, said at least one transformer comprising a magnetic core. The at least one transformer is coupled with at least one of the cables of the power transmission system to be cooled, and supplies the cooling device(s) of the cooling system. In particular, the transformer can be coupled with at least one cable by the magnetic core.

The cooling system may also comprise a sensor for detecting a parameter of the power transmission system. A threshold for the parameter is determined.

The parameter is preferably the current I carried by the cable, or a function of said current, for example the temperature of the cable, or the power transported by the cable itself. A threshold current $I^{th}$ is determined.

Preferably, the threshold $I^{th}$ is determined as the current at which a conductor of the cable reaches a maximum allowed temperature in case no cooling is applied.

Preferably, the threshold $I^{th}$ is of from 30% to 50% of a maximum current carried by the cable.

When the detected current I exceeds the threshold current $I^{th}$, the transformer is operated to supply the cooling device(s) with a maximum power $P_{max}$, which depends on the current I carried by the power transmission system according to a first function $P_{max} = f_1(I)$.

When the detected current I is lower than the threshold current $I^{th}$, the transformer is operated to supply the cooling device(s) with an intermediate power $P_x$, which depends on the current I carried by the power transmission system according to a second function $P_x = f_2(I)$. The intermediate power $P_x$ is a portion of the maximum power $P_{max}$, preferably $P = f_2(I) = k \cdot f_1(I)$, where k is higher than 0 and lower than 1.

The Applicant has observed that the operational cost of the power transmission system is advantageously lower than the operational cost which would be obtained by supplying the cooling device(s) with the maximum power $P_{max}$, over the whole current range $I \leq I^{th}$. In particular, the value of k is determined so as to minimize an operational cost of cooling the power transmission system, said cost taking into account both the cost for transporting power through the power transmission system and the cost for operating the cooling device(s) over the whole current range Hence, supplying the cooling device(s) with a portion $k \cdot P_{max}$ of the maximum power $P_{max}$ advantageously allows minimizing the operational cost of the power transmission system in case of reduced loads, namely in the range $I \leq I^{th}$.

Advantageously, the factor k is a constant value, ranging from 0.2 to 0.7.

In the present system, the control unit comprises at least one switch which is operated by the control unit when the parameter is higher than the threshold so that the cooling device is connected between a first terminal and a second terminal of the at least one transformer.

The control unit comprises at least one switch which is operated by the control unit when the parameter is lower than or equal to the threshold so that the cooling device is connected between a first terminal and an intermediate terminal of the at least one transformer.

In the present system, the cooling device can comprise one or more fans, for example suction fans.

For the purpose of the present description and of the claims, except where otherwise indicated, all numbers expressing amounts, quantities, percentages and so forth are to be understood as being modified in all instances by the term "about". Also, all ranges include any combination of the maximum and minimum points disclosed and include any intermediate range therein, which may or may not be specifically enumerated herein.

BRIEF DESCRIPTION OF THE DRAWINGS

The present invention will become fully clear by reading the following detailed description, to be read by referring to the accompanying drawings, wherein:

FIG. 1A is an enlarged view of a portion of the power transmission system of FIG. 1 showing three transformers and a junction box;

DETAILED DESCRIPTION OF PREFERRED EMBODIMENTS OF THE INVENTION

Figure 1:
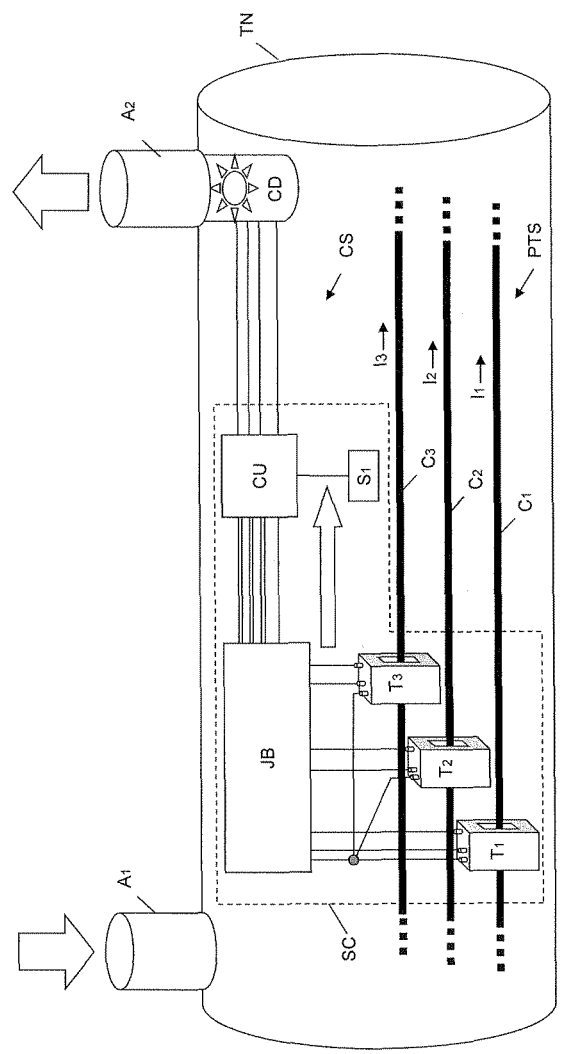
FIG. 1 is a schematic view of a power transmission system provided with a cooling system according to an embodiment of the present invention.

FIG. 1 schematically shows the tunnel TN housing the power transmission system PTS provided with a cooling system CS according to an embodiment of the present invention.

The power transmission system PTS is preferably a high voltage power transmission system, namely a power transmission system suitable for distributing power at a voltage higher than 35 kV in an Alternating Current (AC).

The power transmission system PTS may comprise one or more circuits, each circuit being either a single-phase circuit or a three-phase circuit. By way of non-limiting example, the power transmission system PTS shown in FIG. 1 comprises a three-phase circuit comprising three parallel cables $C_1$, $C_2$, $C_3$, each being suitable for carrying a respective alternating current $I_1$, $I_2$, $I_3$. The three alternating currents have a reciprocal phase of $2\pi/3$ and have same amplitude.

The cooling system CS comprises at least one cooling device CD arranged at a predetermined position of the power transmission system PTS. Preferably, the cooling device CD is arranged in the vicinity of an air outlet $A_2$ of the tunnel TN housing the power transmission system PTS. In FIG. 1, for simplicity, a single cooling device CD is shown. However, the cooling system CS may comprise a number of cooling devices CD, for instance a number of cooling devices CD evenly distributed along the power transmission system PTS.

The cooling device CD comprises one or more fans, for example compression or suction fans, preferably suction fans. Each fan is preferably provided with a shutter which automatically opens upon passage of an airflow and which protects the fan from possible backward airflows.

The cooling system CS also comprises a supply circuit SC suitable for feeding the cooling device CD. The supply circuit SC comprises at least one transformer suitable for extracting a power from the power transmission system PTS and for supplying the cooling device CD with the extracted power. More particularly, the supply circuit SC preferably comprises a number of transformers equal to the number of cables of the power transmission system PTS, each transformer being coupled with a respective cable. Hence, in the exemplary power transmission system PTS shown in FIG. 1, the supply circuit SC comprises three transformers $T_1$, $T_2$, $T_3$, each transformer $T_1$, $T_2$, $T_3$ being coupled with a respective cable $C_1$, $C_2$, $C_3$ of the three-phase circuit. In case the power transmission system PTS comprises two or more three-phase circuits, each cable of each circuit may have its own transformer. Transformers coupled with cables associated to a same phase are preferably connected in parallel.

Figure 2:
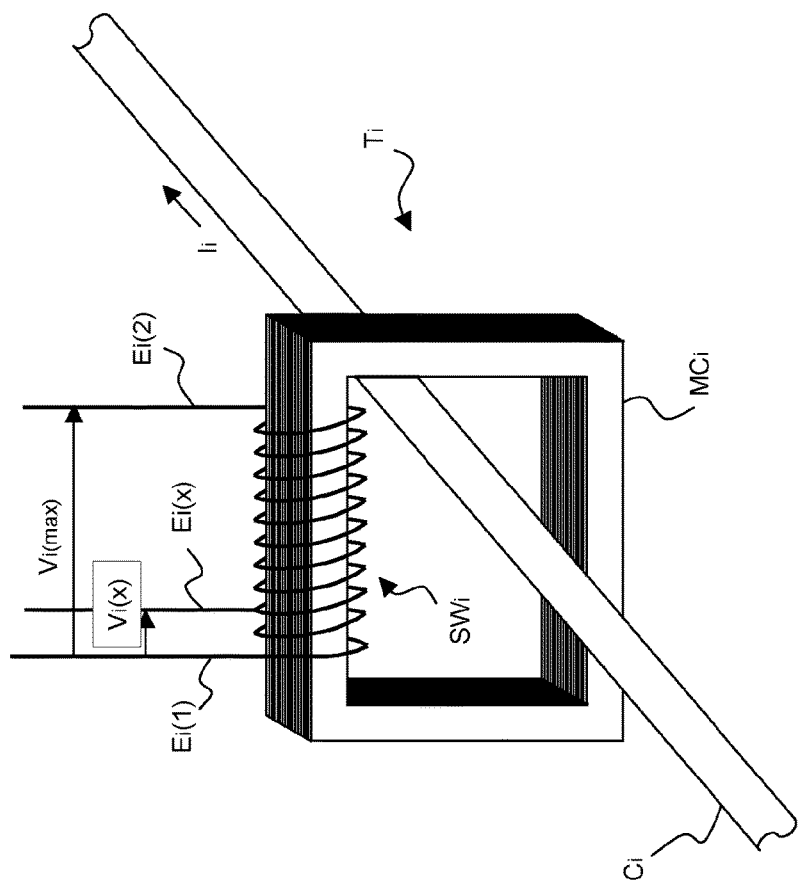
FIG. 2 shows a transformer coupled with a cable of the power transmission system according to an embodiment of the present invention.

FIG. 2 shows in further detail a transformer $T_i$ (i=1, 2, 3) coupled with the respective cable $C_i$ (i=1, 2, 3). The transformer $T_i$ comprises a magnetic core $MC_i$, which preferably is a laminated magnetic core. The cable $C_i$ passes through the central opening of the magnetic core $MC_i$, and basically acts as a primary winding of the transformer $T_i$. The transformer Ti further comprises a secondary winding $SW_i$ forming a number N of turns about the magnetic core $MC_i$ and having a first terminal $E_i(1)$ and a second terminal $E_i(2)$.

The transformer $T_i$ also comprises an intermediate terminal $E_i(x)$ which is placed at an intermediate position of the secondary winding $SW_i$, so as to contact one of the intermediate turns of the secondary winding $SW_i$. The intermediate terminal $E_i(x)$ is placed so that the number of turns comprised between the first terminal $E_i(1)$ and the intermediate terminal $E_i(x)$ is N*, N* being lower than N. The position of the intermediate terminal $E_i(x)$ (and therefore the number N*) is determined based on a predetermined criterion, which will be described in detail herein after.

Each of the three transformers $T_1'$, $T_2'$, $T_3'$ preferably has the same structure as the transformer $T_i'$ described above. In particular, the number of turns N and N* are preferably the same in the three transformers $T_1'$, $T_2'$, $T_3'$.

By referring again to FIG. 1, the cooling system CS comprises a junction box JB. The first terminals $E_1(1)$, $E_2(1)$, $E_3(1)$ of the transformers $T_1$, $T_2$, $T_3$ are preferably mutually connected and then connected to the junction box JB. Further, the second terminal $E_1(2)$, $E_2(2)$, $E_3(2)$ and the intermediate terminals $E_1(x)$, $E_2(x)$, $E_3(x)$ of the transformers $T_1$, $T_2$, $T_3$ are also preferably connected to the junction box JB.

The supply circuit SC of the cooling system CS preferably comprises also a control unit CU interposed between the junction box JB and the cooling device CD. The junction box JB receives input lines from the first terminals $E_1(1)$, $E_2(1)$, $E_3(1)$, from the second terminals $E_1(2)$, $E_2(2)$, $E_3(2)$ and from the intermediate terminals $E_1(x)$, $E_2(x)$, $E_3(x)$ of the transformers $T_1$, $T_2$, $T_3$; houses said lines; and outputs them towards the control unit CU. The control unit CU preferably comprises a number of switches suitable for connecting/disconnecting the second terminals $E_1(2)$, $E_2(2)$, $E_3(2)$ and/or the intermediate terminals $E_1(x)$, $E_2(x)$, $E_3(x)$ of the transformers $T_1$, $T_2$, $T_3$ to the cooling device CD, as it will be described in detail herein after. The switches of the control unit CU are preferably remote control switches which, optionally, may be manually operated. Moreover, the control unit CU may comprise manual switches suitable for being used by a human operator for control and management, magneto-thermic switches for protecting the cable supplying power to the fans of the cooling device CD, apparatuses for supplying power to the fans also in emergency situations, and the like.

Preferably, the supply circuit SC also comprises a current sensor $S_1$ configured to detect the current I carried by any of the cables $C_1$, $C_2$, $C_3$ of the power transmission system PTS (as mentioned above, the alternating currents $I_1$, $I_2$, $I_3$ carried by the cables $C_1$, $C_2$, $C_3$ have a same amplitude I). The control unit CU is preferably configured to monitor the current detected by the current sensor $S_1$ and to control the power supplied to the cooling device CD based on the detected value by suitably operating its switches, as it will be described in detail hereinafter.

Both the power transmission system PTS and the cooling system CS may be arranged in a partially closed environment, such as a tunnel or a vault. As from FIG. 1, the tunnel TN is preferably provided with an air inlet $A_1$ and an air outlet $A_2$.

The operation of the cooling system CS according to an embodiment of the present invention will be now described in detail herein after.

As mentioned above, each cable $C_1$, $C_2$, $C_3$ carries a respective alternating current $I_1$, $I_2$, $I_3$ having the same amplitude and producing a mutual induction effect in the respective transformer $T_1$, $T_2$, $T_3$. Such mutual induction effect generates in each transformer $T_1$, $T_2$, $T_3$:

- a first voltage $V_{1(max)}$, $V_{2(max)}$, $V_{3(max)}$ and a corresponding first power $P_{1(max)}$, $P_{2(max)}$, $P_{3(max)}$ between the first terminal $E_1(1)$, $E_2(1)$, $E_3(1)$ and the second terminal $E_1(2)$, $E_2(2)$, $E_3(2)$; and
- a second voltage $V_1(x)$, $V_2(x)$, $V_3(x)$ and a corresponding second power $P_1(x)$, $P_2(x)$, $P_3(x)$) between the first terminal $E_i(1)$ $E_2(1)$, $E_3(1)$ and the intermediate terminal $E_i(x)$, $E_2(x)$, $E_3(x)$.

Hence transformers $T_1$, $T_2$, $T_3$ may supply a load connected between their first terminals $E_1(1)$, $E_2(1)$, $E_3(1)$ and their second terminals $E_1(2)$, $E_2(2)$, $E_3(2)$ with a maximum power $P_{max}=P_{1(max)}+P_{2(max)}+P_{3(max)}$ which depends on the current I. In the following description and claims, the expression "current I" will indicate the amplitude of the alternating currents $I_1$, $I_2$, $I_3$. In particular, the maximum power $P_{max}$ depends on the current I carried by each cable $C_1$, $C_2$, $C_3$ of the power transmission system PTS according to a first function, namely $P_{max}=f_1(I)$. In particular, the maximum power $P_{max}$ is proportional to the square of the current I multiplied by N, N being the number of turns of the secondary winding in each transformer $T_1$, $T_2$, $T_3$.

Besides, transformers T1, T2, T3 may supply a load connected between their first terminals $E_1(1)$, $E_2(1)$, $E_3(1)$ and their intermediate terminals $E_1(x)$, $E_2(x)$, $E_3(x)$ with an intermediate power $P_x=P_1(x)+P_2(x)+P_3(x)$, which also depends on the current I. In particular, the intermediate power $P_x$ depends on the current I carried by each cable $C_1$, $C_2$, $C_3$ of the power transmission system PTS according to a second function, namely $P_x=f_2(I)$. In particular, the intermediate power $P_x$ is proportional to the square of the current I multiplied by $N^*$, $N^*$ being the number of turns of the secondary winding comprised between the first terminal $E_1(1)$, $E_2(1)$, $E_3(1)$ and the intermediate terminal $E_1(x)$, $E_2(x)$, $E_3(x)$ in each transformer $T_1$, $T_2$, $T_3$. Hence, the intermediate power $P_x$ is a portion of the maximum power $P_{max}$, namely $P_x=k\ P_{max}$ or $f_2(I)=k\ f_1(I)$, where $k=N^*/N$. Since $N^*$ is lower than N, k is lower than 1.

The cooling device CD may be supplied either with the maximum power $P_{max}$ or with the intermediate power $P_x$.

In particular, a threshold current $I^{th}$ is determined. The threshold current $I^{th}$ is preferably determined in a steady state condition. As "steady state condition" is meant the condition that exists after initial transients or fluctuating conditions have damped out, and currents, voltages, or fields remain essentially constant, or oscillate uniformly. For example, the threshold current $I^{th}$ is determined as the current at which the conductors of the cables $C_1$, $C_2$, $C_3$ of the power transmission system PTS reach a maximum allowed temperature $T_{max}^*$ in case no cooling is applied. The maximum allowed temperature $T_{max}^*$ preferably is the maximum temperature, in a steady state condition, at which the conductors of the cables $C_1$, $C_2$, $C_3$ may operate with acceptable performance and without breakage or fire hazards (e.g. 90° C.). The maximum allowed temperature $T_{max}^*$ may be determined by detecting the temperature of the power transmission system PTS at the air outlet A2 and/or the temperature of outer surface of the cable sheath, said temperatures being considered as function of the conductor temperature. The threshold current $I^{th}$ depends on the characteristics of the cables $C_1$, $C_2$, $C_3$ (in particular, their sections). The threshold current $I^{th}$ is preferably of from 30% to 50% (e.g. about 40%) of the maximum current $I_{max}$ that a cable of the power transmission system may carry (with cooling applied).

The control unit CU preferably monitors the current I as detected by the current sensor $S_1$.

When the control unit CU determines that the detected current I is lower than or equal to the threshold current $I^{th}$, it preferably operates its switches in order to connect the cooling device CD between the first terminals $E_1(1)$, $E_2(1)$, $E_3(1)$ and the intermediate terminals $E_i(x)$, $E_2(x)$, $E_3(x)$ of the transformers $T_1$, $T_2$, $T_3$. In such configuration, the cooling device CD is supplied with the intermediate power $P_x=f_2(I)$. The cooling device CD then generates an airflow, which removes at least part of the heat released by the power transmission system PTS.

Besides, when the control unit CU determines that the detected current I is higher than the threshold current $I^{th}$, it preferably operates its switches in order to connect the cooling device CD between the first terminals $E_1(1)$, $E_2(1)$, $E_3(1)$ and the second terminals $E_1(2)$, $E_2(2)$, $E_3(2)$ of the transformers $T_1$, $T_2$, $T_3$. In such configuration, the cooling device CD is supplied with the maximum power $P_{max}=f_1(I)$. The cooling device CD then continues generating the airflow, which removes at least part of the heat released by the power transmission system PTS.

Figure 3A:
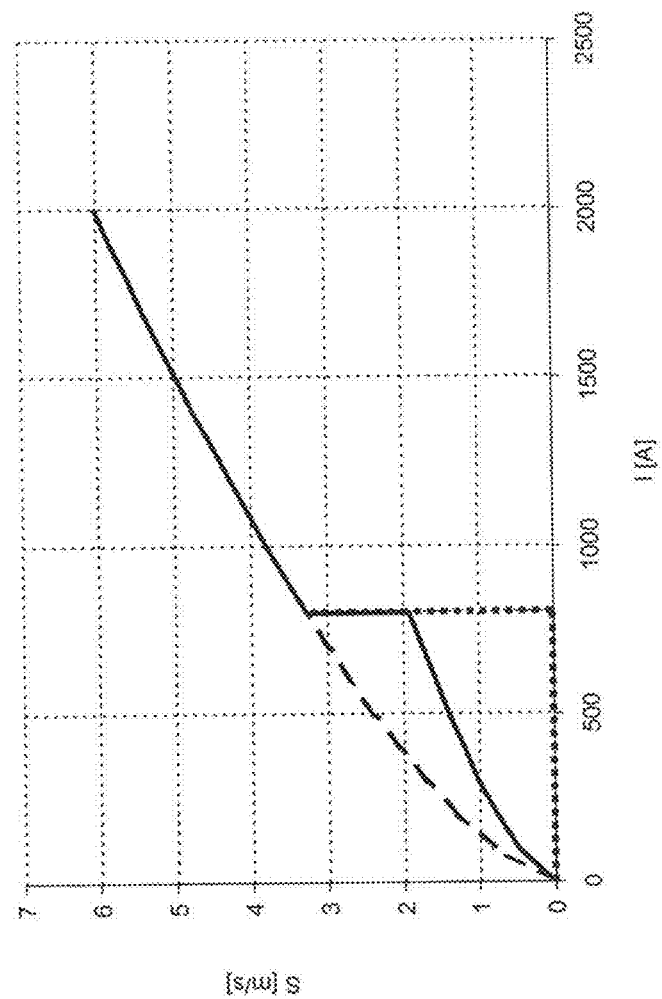
FIGS. 3A, 3B, and 3C are graphs of, respectively, airflow speed, maximum temperature, and operational cost versus current carried by the power transmission system according to an embodiment of the present invention as compared to two known cooling systems.
Figure 3B:
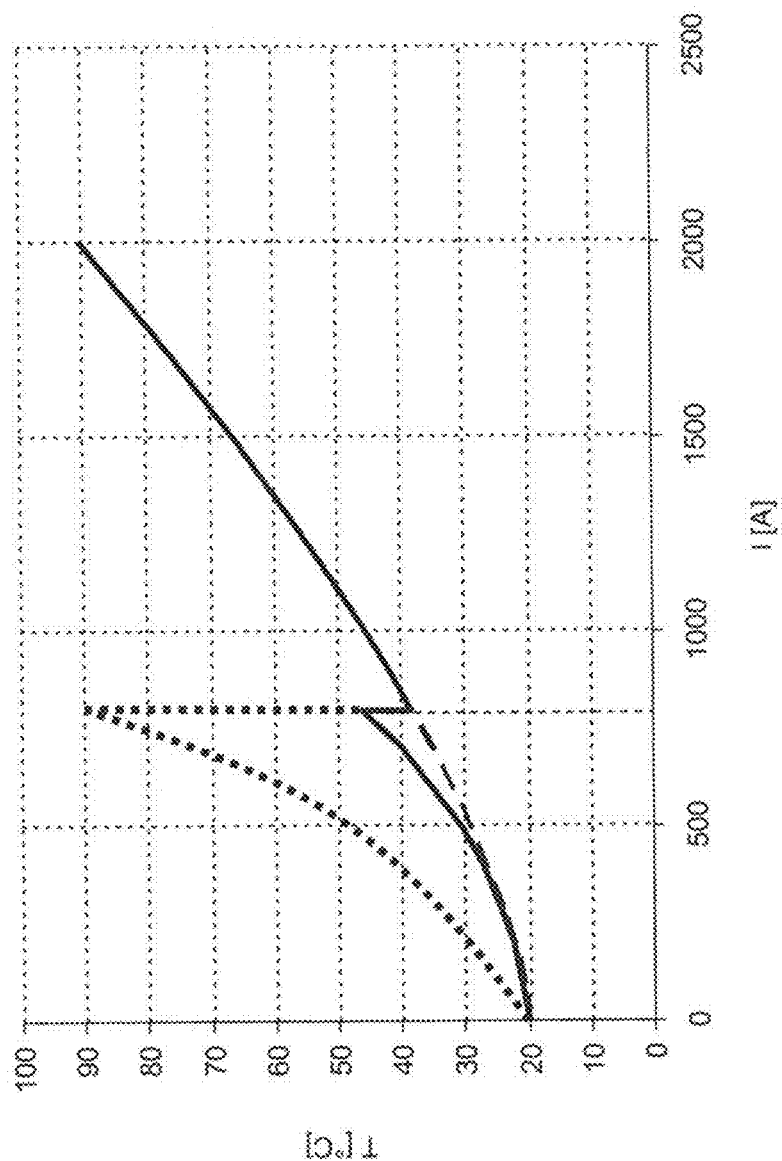
Figure 3C:
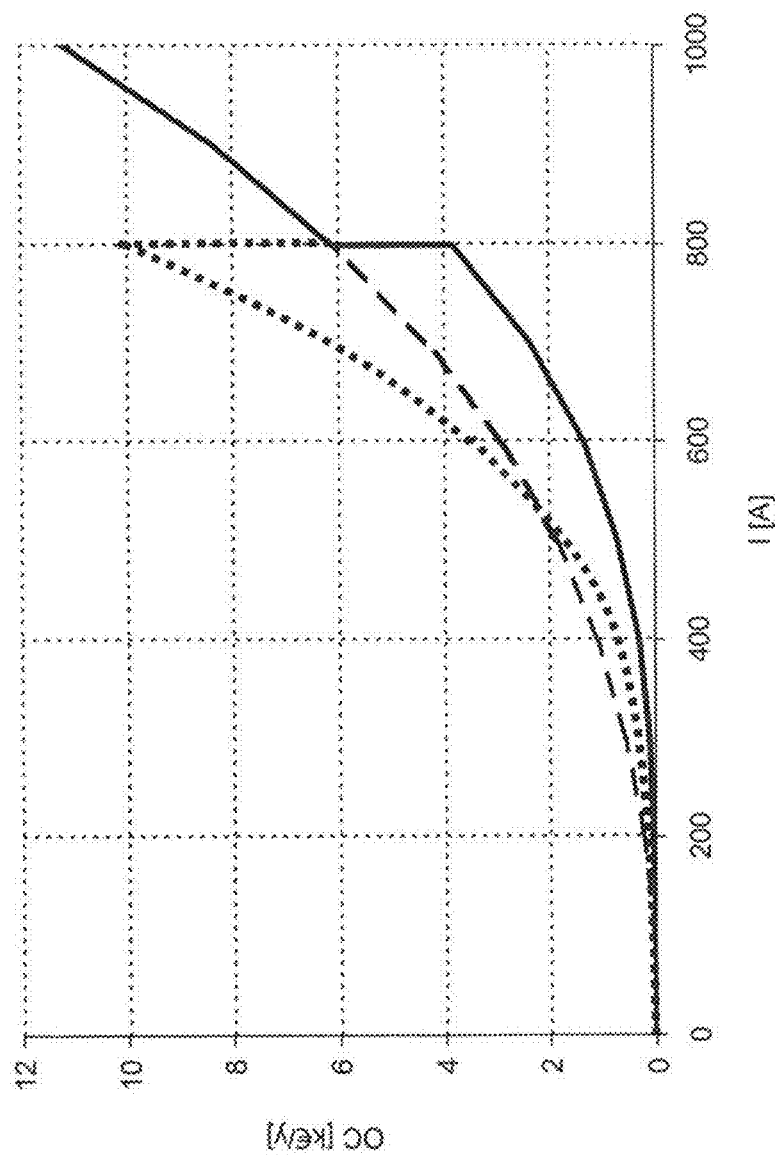

FIGS. 3A, 3B, and 3C show the results of numerical simulations carried out by the Applicant in accordance with "Calcul de la température des câbles dans les tunnels ventilés", Électra n. 143-144, August 1992. These numerical simulations relate to the cooling device CD according to an embodiment of the present invention. The numerical simulations have been carried out under the following assumption:

- power transmission system comprising two parallel three-phase circuits (six cables);
- maximum current $I_{max}$ of each cable: 2000 A;
- threshold current $I^{th}$: 40% of $I_{max}$, namely 800 A;
- maximum allowed conductor temperature $T_{max}^*$: 90° C.;
- single cooling device comprising two parallel three-phase suction fans;
- suction fans maximum power: 25 kW;
- maximum flow capacity of the cooling device: 6 m/s;
- maximum voltage $V_{i(max)}$ of each transformer (obtained with maximum current $I_{max}$=2000 A): 220 V;
- maximum power $P_{i(max)}$ of each transformer (obtained with maximum current $I_{max}$=2000 A): 10 kW;
- length of tunnel: 2500 m;
- size of tunnel cross section: 2.5 m×2 m; and
- average cost per hour of power extracted from power transmission system: 50 €/MWh.

FIG. 3A shows the speed S (m/s) of the airflow generated by the cooling device, as a function of the current I (A) carried by each cable of the power transmission system.

The solid line of FIG. 3A represents the operation according to the invention and shows that, while the current I is lower than or equal to a threshold current $I^{th}$=800 A, the airflow speed increases as the current I increases, because the cooling device is supplied with the intermediate power $P_x=f_2(I)$. In particular, the airflow speed is proportional to the cubic root of the intermediate power $P_x$ that, as described above, is proportional to the square of the current I multiplied by $N^*$. Therefore, below the threshold current $I^{th}$ the airflow speed is proportional to $(N^* \cdot I^2)^{1/3}$.

It shall be noticed that, as the current I increases, thereby causing an increase of the heat released by the power transmission system, also the airflow speed increases, thereby increasing the amount of heat removed from the power transmission system. In other words, the greater the heat produced by the power transmission system, the greater is the heat removed by the cooling system. The cooling system of the invention is then capable of self-adapting to changes of the operating conditions of the power transmission system PTS also in the range $I=I<I^{th}$.

As the current I reaches the threshold current $I^{th}=800$ A, the airflow speed steeply increases because the cooling device starts being supplied with the maximum power $P_{max}=f_1(I)$. The airflow speed then increases as the current I increases, and reaches its maximum value (namely, the maximum capacity of the cooling device) of 6 m/s when the current I equals the maximum current $I_{max}=2000$ A. In the range $I>=I^{th}$, the airflow speed is proportional to the cubic root of the maximum power $P_{max}$ that, as described above, is proportional to the square of the current I multiplied by N. Therefore, above the threshold current $I^{th}$ the airflow speed is proportional to $(N \cdot I^2)^{1/3}$.

The dashed line in FIG. 3A relates to a first comparative example of the cooling system. In this comparative example, the cooling device was supplied with the maximum power $P_{max}$ also below the current threshold $I^{th}$. In such case, the airflow speed is in any condition proportional to $(N \cdot I^2)^{1/3}$ (and not to $(N^* \cdot I^2)^{1/3}$), also below the threshold current $I^{th}$.

The dotted line in FIG. 3A relates to a second comparative example of operation of the cooling system. In this comparative example, the cooling device was switched off below the current threshold $I^{th}$. As the current I reaches the threshold current $I^{th}=800$ Å, the airflow speed steeply passes from zero to a non-zero value, because the cooling device is switched on and starts being supplied with the maximum power $P_{max}=f_1(I)$. The airflow speed then gradually increases as the current I increases and reaches its maximum value (namely, the maximum flow capacity of the cooling device) of 6 m/s when the current I equals the maximum current $I_{max}=2000$ A. In the range $I>I^{th}$, the airflow speed is proportional to the cubic root of the maximum power $P_{max}$ that, as described above, is proportional to the square of the current I multiplied by N. Therefore, above the threshold current $I^{th}$, the airflow speed is proportional to $(N \cdot I^2)^{1/3}$.

FIG. 3B shows the maximum temperature T (° C.) of the power transmission system (possibly corresponding to the maximum temperature of the cable conductor) as a function of the current I (A) carried by each cable of the power transmission system.

The solid line of FIG. 3B represents the operation according to the invention and shows that, while the current I is lower than or equal to the threshold current $I^{th}=800$ A, the maximum temperature increases. Such an increase is much lower than the temperature increase shown by the second comparative example of the cooling system (dotted line in FIG. 3B) because a temperature control is applied also below the threshold current $I^{th}$. Hence the maximum temperature reached at the threshold current $I^{th}=800$ A is about 45° C., far lower than the maximum allowed temperature $T_{max}*=90°$ C. Then, as the current I exceeds the threshold current $I^{th}=800$ A, the maximum temperature steeply decreases from the value of about 45° C., as a consequence of the fact that the cooling device starts being supplied with the maximum power $P_{max}$. The maximum temperature then increases again as the current I increases, and reaches the maximum allowed temperature $T_{max}*=90°$ when the current I equals the maximum current $I_{max}$.

By maintaining the cable temperature at values lower than that reached by the second comparative cooling system, the cooling system of the present embodiment is more effective in limiting resistive losses and damages to the overall cable structure due to the heat. In addition, the overall operational cost of the cooling system of the present embodiment is remarkably lower that that of the second comparative cooling system, as it will be shown with reference to the graph of FIG. 3C.

The dashed line in FIG. 3B relates to the operation of the first comparative cooling system of FIG. 3A. In such case, the temperature increasing rate is reduced in comparison to that reached with the cooling system of the present embodiment, because the cooling device is supplied with the maximum power $P_{max}$ also below the current threshold $I^{th}$. This cooling system can provide a greater slowing of the heating process in the power transmission system, however it results in an increased operational cost, as will be described in detail by referring to the graph of FIG. 3C, and in a useless wear of the cooling device because said device operates also when the power transmission system does not actually need to be so remarkably cooled.

FIG. 3C is a graph showing the operational cost OC (k€ /year) of the power transmission system as a function of the current I (A) carried by each cable of the power transmission system. The operational cost takes into account both the cost for transporting power through the power transmission system and the cost for operating the cooling device. The cost for transporting power through the power transmission system increases as the temperature of the power transmission system increases. This is because a temperature increase results in an increased wear of the cables and in an increased cable resistance, which ultimately results in an increase of the cable power losses. On the other hand, lowering the temperature of the power transmission system implies an increase of the cost for operating the cooling device. This is because for lowering the temperature of the power transmission system, the speed of the airflow generated by the cooling device shall be increased and accordingly the wear of the cooling device increases.

The solid line of FIG. 3C represents the operation according to the invention as already discussed in FIGS. 3A and 3B and shows that, while the current I is lower than or equal to the threshold current $I^{th}=800$ A, the operational cost gradually increases, because the cost for transporting power increases due to the temperature increase and also the cost for operating the cooling device increases due to an increasing airflow speed. At $I=I^{th}$, the operational cost steeply increases, mainly due to the increased cost for operating the cooling device as it starts being supplied with the maximum power $P_{max}$. Then, as the current I further increases, the operational cost starts gradually increasing due to both temperature increase (which causes an increase of the cost for transporting the power on the system) and airflow speed increase (which causes an increase of the cost for operating the cooling device).

The dashed line in FIG. 3C relates to the operation of the first comparative cooling system of FIG. 3A. In the whole range $I=<I^{th}$, the operational cost of this comparative example is higher than that of a system according to the present invention (solid line of FIG. 3C) wherein the cooling device is supplied with the intermediate power $P_x$, and not with the maximum power $P_{max}$. Below the threshold current $I^{th}$, it is more convenient not fully exploiting the cooling device and renouncing to a part of the maximum cooling effect which could be obtained by supplying the cooling device with the maximum power $P_{max}$.

The dotted line of FIG. 3C represents the operation of the second comparative cooling system of FIG. 3A and shows that, while the current I is lower than or equal to the threshold current $I^{th}=800$ A, the operational cost increases to remarkable values because the cost for transporting power increases due to the temperature increase. The cost for operating the cooling device is zero because the cooling device is switched off.

Even at relatively low current values (for example, at about 400 A), the cost of the second comparative cooling device is somewhat higher than that generated with the cooling system of the present embodiment, because the cost due to resistive loss in a not cooled cable surprisingly resulted to be higher than the cost of providing the cable with a cooling system supplied with an intermediate power $P_x$ according to the invention.

At $I=I^{th}$, the operational cost of the second comparative cooling device steeply decreases, mainly due to the sudden, significant temperature decrease operated by the cooling device as it is switched on. Then, as the current I further increases, the operational cost starts gradually increasing again due to both temperature increase (which causes an increase of the cost for transporting the power on the system) and airflow speed increase (which causes an increase of the cost for operating the cooling device).

As mentioned above, the intermediate power $P_x$ is a portion of the maximum power $P_{max}$, namely $P_x=k\cdot P_{max}$, k being lower than 1. k is equal to $N^*/N$. The ratio $N^*/N$ (and therefore the value of k) may be chosen so as to minimize the operational cost of the power transmission system when the current I is lower than or equal to the threshold current $I^{th}$.

The value of $k=N^*/N$ is preferably of from 0.2 to 0.7 In the case of the above assumptions upon which the numerical simulations of FIGS. 3A, 3B, and 3C are based, the Applicant has estimated that a minimum operational cost over the whole range $I=<I^{th}$ is obtained when $k=N^*/N=0.2$. This may be achieved, for example, by providing each transformer coupled with the cables of the power transmission system with:
- an overall number of turns equal to N=10 or N=100; and
- an intermediate terminal at a position such that the number of turns comprised between the first terminal and the intermediate terminal of the transformer is equal to $N^*=2$ when N=10 or $N^*=20$ when N=100.

In the case depicted by the solid line in FIGS. 3A, 3B, and 3C, the Applicant has estimated that such value of $k=N^*/N=0.2$ corresponds to a minimum operational cost over the whole range $I=<I^{th}$, because it corresponds to a trade-off between:
- cost decrease due the temperature reduction of the power transmission system due to the cooling effect exerted by the cooling device; and
- cost increase due to the operation of the cooling device.

By suitably choosing k so as to minimize the operational cost of the power transmission system over the whole range $I=<I^{th}$, the method for cooling the power transmission system according to the present invention is accordingly very efficient also in case of low loads.

Further, the cooling system of the present invention is advantageously very safe. The power supply of the cooling device is always guaranteed when the power transmission system is operating, because it is derived directly from the power transmission system itself. Then, the risk that the power transmission system operates without any temperature control is advantageously minimized.

According to embodiments of the present invention not shown in the drawings, the cooling device may comprise, in addition or alternatively to the current sensor, a temperature sensor suitable for detecting the maximum temperature of the power transmission system, namely the temperature of the power transmission system at the air outlet $A_2$ and/or the temperature of the cable surface which is function of the conductor temperature.

According to these embodiments, in addition or alternatively to the threshold current $I^{th}$, a threshold temperature $T^{th}$ is preferably determined. The threshold temperature is preferably set equal to the maximum allowed temperature $T_{max}^*$, namely to the maximum temperature that the power transmission system PTS reaches when the current I equals the threshold current $I^{th}$.

According to these embodiments, the control unit of the cooling system controls the power supply of the cooling device based on the detected maximum temperature and its comparison with the threshold temperature $T^{th}$, alone or in combination with the detected current and its comparison with the current threshold $I^{th}$. In the latter case (combination of current and temperature control), the temperature detection-comparison advantageously allows the control unit to control in a more precise way the power supply of the cooling device, especially when the current I is close to the current threshold $I^{th}$ to the maximum temperature $I_{max}$. This advantageously prevents the power transmission system from operating at a temperature higher than the maximum allowed temperature $T_{max}^*$ in a more efficient way.

The invention claimed is:

1. A cooling system for cooling a power transmission system that comprises a cable configured to carry a current corresponding to a transported electric power, the cooling system comprising:
   - a cooling device configured to remove heat from the power transmission system;
   - a power supply system configured to extract a power fraction from the cable and configured to supply the cooling device with the power fraction; and
   - a control unit configured to control an amount of the extracted power fraction in response to a parameter of the electric power transported in the cable, so that:
     - when the parameter is higher than a threshold, the extracted power fraction is equal to a first value that depends on the electric power carried in the cable through a first function; and
     - when the parameter is lower than the threshold, the extracted power fraction is equal to a second value that depends on the electric power carried in the cable through a second function, the second function corresponding to the first function multiplied by a unitless factor k, where the unitless factor k is greater than 0, and where the unitless factor k is less than 1.

2. The cooling system of claim 1, wherein the parameter is the current carried by the cable.

3. The cooling system of claim 1, wherein the power supply system comprises at least one transformer, and
   wherein the least one transformer comprises a magnetic core.

4. The cooling system of claim 1, wherein the unitless factor k is chosen to minimize an operational cost of cooling the power transmission system when the parameter is lower than or equal to the threshold.

5. The cooling system of claim 1, wherein the unitless factor k is a constant value.

6. The cooling system of claim 1, wherein the unitless factor k is greater than or equal to 0.2 and less than or equal to 0.7.

7. The cooling system of claim 1, wherein the threshold is the current at which a conductor of the cable reaches a maximum allowed temperature in case no cooling is applied.

8. The cooling system of claim 1, wherein the threshold is greater than or equal to 30% and less than or equal to 50% of a maximum current carried by the cable.

9. The cooling system of claim 1, wherein the cooling device comprises at least one suction fan.

10. A method for cooling a power transmission system that comprises a cable configured to carry a current corresponding to a transported electric power, the method comprising:

extracting a power fraction from the cable; and supplying a cooling device, which is configured to remove heat from the power transmission system, with the extracted power fraction, wherein the power fraction is extracted so that:

when a parameter of the electric power transported in the cable is higher than a threshold, the extracted power fraction is equal to a first value that depends on the electric power carried in the cable through a first function; and when the parameter is lower than the threshold, the extracted power fraction is equal to a second value that depends on the electric power carried in the cable through a second function, the second function corresponding to the first function multiplied by a unitless factor k, where the unitless factor k is greater than 0, and where the unitless factor k is less than 1.

11. The method of claim 10, wherein the unitless factor k is chosen to minimize an operational cost of cooling the power transmission system when the parameter is less than or equal to the threshold.

12. The method of claim 10, wherein the parameter is the current carried by the cable.

13. The method of claim 10, wherein the threshold is the current at which a conductor of the cable reaches a maximum allowed temperature in case no cooling is applied.

14. The method of claim 10, wherein the unitless factor k is a constant value.

15. The method of claim 10, wherein the unitless factor k is greater than or equal to 0.2 and less than or equal to 0.7.

16. The method of claim 10, wherein the threshold is greater than or equal to 30% and less than or equal to 50% of a maximum current carried by the cable.

17. The method of claim 10, wherein the cooling device comprises at least one suction fan.

18. The method of claim 12, wherein the threshold is the current at which a conductor of the cable reaches a maximum allowed temperature in case no cooling is applied.

19. A cooling system for cooling a power transmission system that comprises a cable configured to carry a current corresponding to a transported electric power, the cooling system comprising:

a cooling device configured to remove heat from the power transmission system;

a power supply system configured to extract a power fraction from the cable and configured to supply the cooling device with the power fraction; and a control unit configured to control an amount of the extracted power fraction in response to a parameter of the electric power transported in the cable, so that:

when the parameter is higher than a threshold, the extracted power fraction is equal to a first value that depends on the electric power carried in the cable through a first function of the current carried by the cable; and when the parameter is lower than the threshold, the extracted power fraction is equal to a second value that depends on the electric power carried in the cable through a second function of the current carried by the cable, the second function corresponding to the first function multiplied by a factor k, where the factor k is greater than 0, and where the factor k is less than 1.

20. The cooling system of claim 19, wherein the first function of the current carried by the cable is proportional to the square of the current carried by the cable, and wherein the second function of the current carried by the cable is proportional to the square of the current carried by the cable.

* * * * *